United States Patent
Allegra et al.

(10) Patent No.: US 8,155,394 B2
(45) Date of Patent: Apr. 10, 2012

(54) WIRELESS LOCATION AND FACIAL/SPEAKER RECOGNITION SYSTEM

(75) Inventors: Manlio Allegra, Los Altos Hills, CA (US); Martin Feuerstein, Redmond, WA (US); Mahesh B. Patel, Saratoga, CA (US); David Stevenson Spain, Jr., Portola Valley, CA (US)

(73) Assignee: Polaris Wireless, Inc., Mountain View, CA (US)

( * ) Notice: Subject to any disclaimer, the term of this patent is extended or adjusted under 35 U.S.C. 154(b) by 0 days.

(21) Appl. No.: 13/182,070

(22) Filed: Jul. 13, 2011

(65) Prior Publication Data

US 2012/0014567 A1    Jan. 19, 2012

Related U.S. Application Data

(60) Provisional application No. 61/363,777, filed on Jul. 13, 2010.

(51) Int. Cl.
 *G06K 9/00* (2006.01)
(52) U.S. Cl. ..... 382/115; 704/231; 704/246; 455/404.2; 455/414.2
(58) Field of Classification Search ............... 382/115
See application file for complete search history.

(56) References Cited

U.S. PATENT DOCUMENTS

| | | | | |
|---|---|---|---|---|
| 6,377,699 | B1* | 4/2002 | Musgrave et al. | 382/117 |
| 6,657,538 | B1* | 12/2003 | Ritter | 340/5.81 |
| 7,039,427 | B2* | 5/2006 | Tachikawa | 455/457 |
| 7,197,331 | B2* | 3/2007 | Anastasakos et al. | 455/557 |
| 7,822,411 | B2* | 10/2010 | Nakatani | 455/420 |
| 2003/0161507 | A1* | 8/2003 | Lawandy | 382/118 |
| 2006/0091223 | A1* | 5/2006 | Zellner et al. | 235/492 |
| 2006/0293892 | A1* | 12/2006 | Pathuel | 704/246 |
| 2008/0132199 | A1* | 6/2008 | Hirata | 455/404.2 |
| 2008/0166991 | A1* | 7/2008 | Izumikawa | 455/404.2 |
| 2010/0111377 | A1* | 5/2010 | Monroe | 382/118 |
| 2010/0273505 | A1* | 10/2010 | Moller et al. | 455/456.1 |
| 2010/0317420 | A1* | 12/2010 | Hoffberg | 463/1 |
| 2011/0106736 | A1* | 5/2011 | Aharonson et al. | 706/12 |

* cited by examiner

*Primary Examiner* — Sath V Perungavoor
(74) *Attorney, Agent, or Firm* — DeMont & Breyer, LLC

(57) ABSTRACT

An integrated wireless location and facial/speaker-recognition system that provides distinct advantages over facial-recognition systems and speaker-recognition systems of the prior art is disclosed. The integrated system is capable of using information from a wireless location system to improve the performance of the facial recognition and speaker recognition. The system is capable of processing photographs and/or audio samples captured by a camera/microphone at a fixed location (e.g., a digital pan-zoom-tilt (PZT) surveillance camera, etc.) as well as those captured by a mobile camera/microphone (e.g., a digital camera and microphone in a smartphone, etc.). The system also features a feedback mechanism by which the location-informed results can be used to improve the system's recognition abilities.

20 Claims, 7 Drawing Sheets

WIRELESS LOCATION AND FACIAL/SPEAKER RECOGNITION SYSTEM

CROSS-REFERENCE TO RELATED APPLICATIONS

This application claims the benefit of U.S. Provisional Patent Application No. 61/363,777, filed Jul. 13, 2011, entitled "Wireless Location System Control of Surveillance Cameras," which is also incorporated by reference.

FIELD OF THE INVENTION

The present invention relates to data-processing systems in general, and, more particularly, to an integrated wireless location and facial/speaker recognition system.

BACKGROUND OF THE INVENTION

A facial-recognition system is a data-processing system that employs one or more algorithms for identifying a person from a digital image or video frame. Many facial-recognition algorithms are based on identifying and quantifying distinguishing features of a person's face, such as the relative position, size, and shape of the eyes, the nose, the cheekbones, the jaw, and so forth.

A speaker-recognition system is a data-processing system that employs one or more algorithms for identifying a person from an audio voice sample. Many speaker-recognition systems employ a library of voice prints (also known as templates or models) that are obtained by extracting features from a recording of a person's voice. In such systems, a speaker-recognition algorithm attempts to identify an unknown speaker by determining a best match between an audio sample of his or her voice and a voice print in the library. Speaker-recognition algorithms employ a wide variety of techniques for generating and processing voice prints, including frequency estimation, hidden Markov models, Gaussian mixture models, and decision trees.

SUMMARY OF THE INVENTION

The present invention comprises an integrated wireless location and facial/speaker-recognition system that provides distinct advantages over facial-recognition systems and speaker-recognition systems of the prior art. In particular, the integrated system is capable of using information from a wireless location system to improve the performance of the facial recognition and speaker recognition. For example, suppose that the facial-recognition system identifies a photograph of a gentleman as either John Smith or Bob Walker, and the photograph is captured by a real-time surveillance camera in New York's Times Square. Suppose further that the estimated location of John Smith's smartphone (obtained, perhaps, via the Global Positioning System [GPS] or some other technique) is in Manhattan at 43$^{rd}$ Street and Seventh Avenue, while the estimated location of Bob Walker's smartphone is in Marshall, Tex. It is overwhelmingly more likely, then, that the person in the photograph is John Smith.

In accordance with the illustrative embodiment of the present invention, the integrated wireless location and facial/speaker-recognition system is capable of processing photographs and/or audio samples captured by a camera/microphone at a fixed location (e.g., a digital pan-zoom-tilt (PZT) surveillance camera, etc.) as well as those captured by a mobile camera/microphone (e.g., a digital camera and microphone in a smartphone, etc.). The illustrative embodiment also provides a feedback mechanism by which the facial-recognition and speaker-recognition systems can "learn" from the location-informed results and improve their recognition abilities.

The illustrative embodiment comprises: receiving, by a data-processing system from a facial-recognition system, an assessment A of a photograph taken by a camera, wherein the assessment A comprises a non-empty set of candidate user identifiers, and wherein the photograph is of one or more locations; transmitting, by the data-processing system, one or more of the non-empty set of candidate user identifiers to a wireless location system; receiving, by the data-processing system from the wireless location system, a non-empty set of estimated locations, wherein each of the non-empty set of estimated locations is for a respective wireless terminal that is associated with a respective one of the non-empty set of candidate user identifiers; and generating, by the data-processing system, a new assessment A' that is based on: (i) the assessment A, (ii) the non-empty set of estimated locations, and (iii) the one or more locations photographed by the camera.

DETAILED DESCRIPTION

For the purposes of this specification, the following terms and their inflected forms are defined as follows:

The term "location" is defined as a zero-dimensional point, a one-dimensional line, a two-dimensional area, or a three-dimensional volume.

Figure 1:
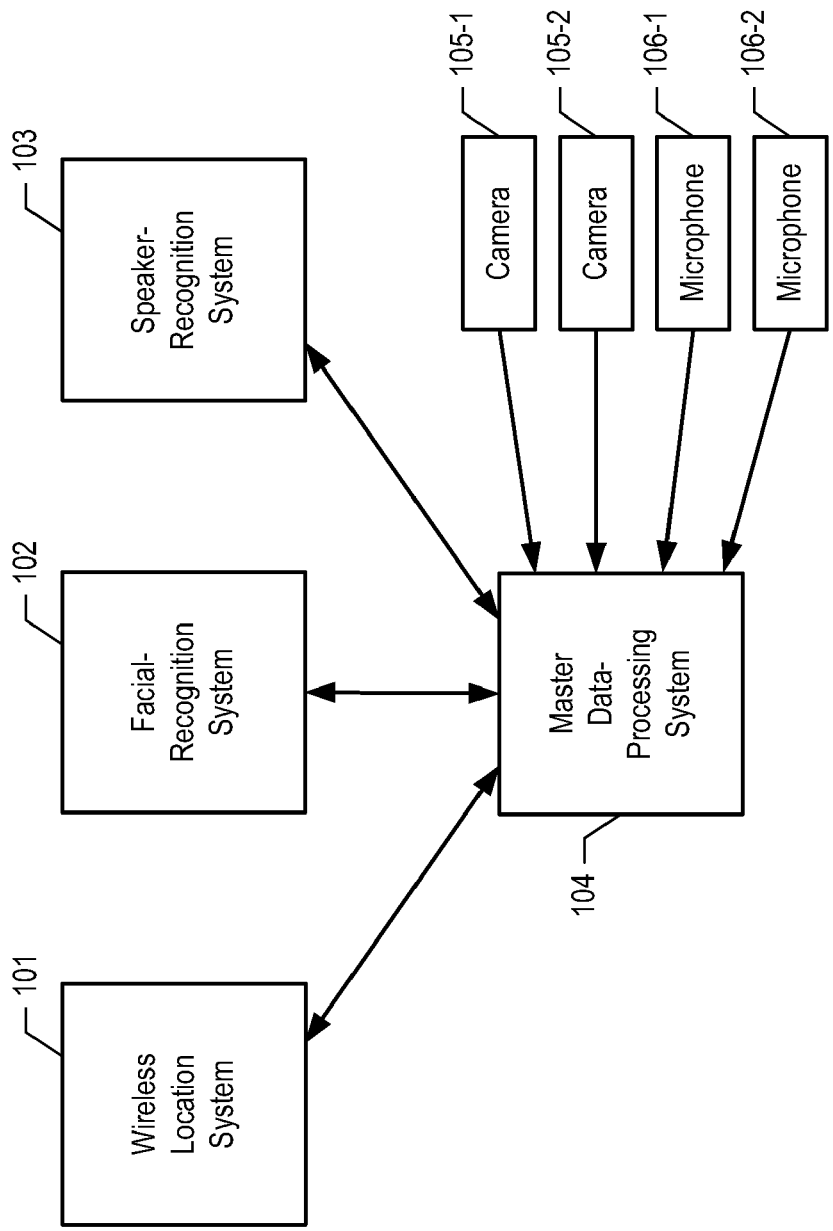
FIG. 1 depicts a block diagram of the salient components of integrated wireless location and facial/speaker-recognition system 100, in accordance with the illustrative embodiment of the present invention.

FIG. 1 depicts a block diagram of the salient components of integrated wireless location and facial/speaker-recognition system 100, in accordance with the illustrative embodiments of the present invention. As shown in FIG. 1, integrated wireless location and facial/speaker-recognition system 100 comprises wireless location system 101, facial-recognition system 102, speaker-recognition system 103, and master data-processing system 104, interconnected as shown.

Wireless location system 101 is a system that comprises hardware and software and that is capable of estimating the location of a plurality of wireless terminals (not shown in FIG. 1), of receiving location queries from master data-processing system 104, and of reporting location estimates to master data-processing system 104. As is well-known in the art, wireless location system 101 might be based on any one of a variety of technologies, such as radio frequency (RF) fingerprinting, Global Positioning System (GPS), triangulation, and so forth.

Facial-recognition system 102 is a data-processing system that comprises hardware and software that is capable of receiving a digital image of a person's face and of estimating the identity of the person, in well-known fashion. In accordance with the illustrative embodiment of the present invention, facial-recognition system 102 estimates the identity of the person by generating an assessment that comprises one or more ordered pairs (person-ID, p), where person-ID is an identifier of a person (e.g., a social security number, an email address, etc.) and p is a probability. For example, an assessment by facial-recognition system 102 of an image might be:

{(111-11-1111, 0.6), (222-22-2222, 0.3), (333-33-3333, 0.1)}

As will be appreciated by those skilled in the art, in some embodiments of the present invention facial-recognition system 102 might generate another type of assessment (e.g., a single identifier of a person without any probability, a ranked plurality of person identifiers without any probabilities, an unranked plurality of person identifiers without any probabilities, etc.), and it will be clear to those skilled in the art, after reading this disclosure, how to make and use such alternative embodiments.

In accordance with the illustrative embodiment, facial-recognition system 102 employs a pattern classifier (e.g., a decision tree, a neural network, etc.) that has been trained on a set of photographs. As will be appreciated by those skilled in the art, in some other embodiments of the present invention facial-recognition system 102 might employ some other type of algorithm or technology to generate assessments.

Speaker-recognition system 103 is a data-processing system that comprises hardware and software that is capable of receiving a digital audio sample of a person speaking and of estimating the identity of the person, in well-known fashion. In accordance with the illustrative embodiment of the present invention, speaker-recognition system 103 estimates the identity of the person by generating an assessment similar in form to that of facial-recognition system 102 (i.e., a set of one or more ordered pairs (person-ID, p)).

As will be appreciated by those skilled in the art, in some embodiments of the present invention speaker-recognition system 103 might generate another type of assessment (e.g., a single identifier of a person without any probability, a ranked plurality of person identifiers without any probabilities, an unranked plurality of person identifiers without any probabilities, etc.), and it will be clear to those skilled in the art, after reading this disclosure, how to make and use such alternative embodiments.

In accordance with the illustrative embodiment, speaker-recognition system 103 employs a pattern classifier (e.g., a decision tree, a neural network, etc.) that has been trained on a set of audio samples. As will be appreciated by those skilled in the art, in some other embodiments of the present invention speaker-recognition system 103 might employ some other type of algorithm or technology to generate assessments.

Figure 2:
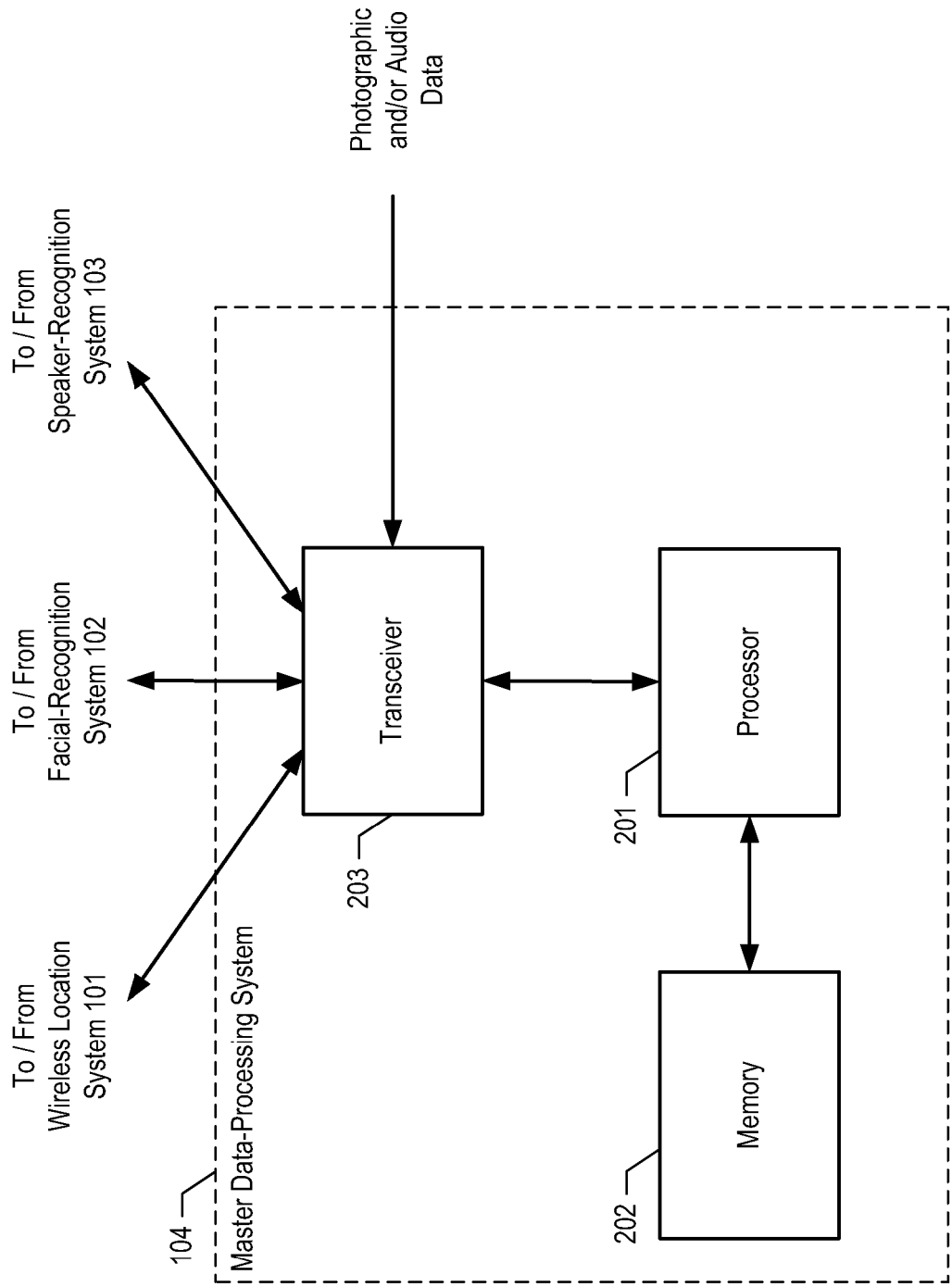
FIG. 2 depicts a block diagram of the salient components of master data-processing system 104, as shown in FIG. 1, in accordance with the illustrative embodiment of the present invention.

Master data-processing system 104 is a data-processing system that is capable of receiving photographic data from one or more cameras (e.g., illustrative cameras 105-1 and 105-2 that are depicted in FIG. 2, etc.), of receiving audio data from one or more microphones (e.g., illustrative microphones 106-1 and 106-2 that are depicted in FIG. 2, etc.), of transmitting location queries to wireless location system 101, of receiving location estimates of wireless terminals from wireless location system 101, of transmitting digital images to facial-recognition system 102, of transmitting digital audio samples to speaker-recognition system 103, of receiving assessments from facial-recognition system 102 and speaker-recognition system 103, and of executing the tasks described below and with respect to FIGS. 3 through 7.

As will be appreciated by those skilled in the art, although in the illustrative embodiment each of wireless location system 101, facial-recognition system 102, speaker-recognition system 103, and master data-processing system 104 are distinct data-processing systems, in some other embodiments two or more of these systems might be part of a common data-processing system (e.g., might be software applications executing on a common hardware platform, etc.), and it will be clear to those skilled in the art, after reading this disclosure, how to make and use such alternative embodiments.

As will further be appreciated by those skilled in the art, the depiction of two cameras and two microphones in FIG. 2 is merely illustrative (i.e., master data-processing system 104 is capable of receiving photographic data from any number of cameras and audio data from any number of microphones). As will yet further be appreciated by those skilled in the art, each camera (e.g., camera 105-1, camera 105-2, etc.) might be at a fixed location (e.g., a digital pan-zoom-tilt (PZT) surveillance camera, etc.) or might be a mobile camera (e.g., a camera in a smartphone, etc.); similarly, each microphone (e.g., microphone 106-1, microphone 106-2, etc.) might be at a fixed location (e.g., a surveillance microphone that is capable of being rotated around one or more axes, etc.) or might be a mobile microphone (e.g., a microphone in a smartphone, etc.).

FIG. 2 depicts a block diagram of the salient components of master data-processing system 104, in accordance with the illustrative embodiment of the present invention. As shown in FIG. 2, master data-processing system 104 comprises processor 201, memory 202, and transceiver 203, interconnected as shown.

Processor 201 is a general-purpose processor that is capable of performing the functionality described below and in the accompanying figures. For example, processor 201 is capable of receiving information from transceiver 203, of reading data from and writing data into memory 202, of executing instructions stored in memory 202, and of forwarding information to transceiver 203, in well-known fashion. As will be appreciated by those skilled in the art, in some alternative embodiments of the present invention processor 201 might be a special-purpose processor, rather than a general-purpose processor.

Memory 202 is capable of storing data and executable instructions, in well-known fashion, and might be any combination of random-access memory (RAM), flash memory, disk drive, etc. In accordance with the illustrative embodiment, memory 202 stores executable instructions corresponding to the pertinent tasks of the flowcharts of FIGS. 3 through 7 below.

Transceiver 203 is capable of receiving signals from wireless location system 101, facial-recognition system 102, and speaker-recognition system 103, and forwarding information encoded in these signals to processor 201; of receiving photographic and/or audio data and forwarding these data to processor 201; and of receiving information from processor 201 and transmitting signals that encode this information to wireless location system 101, facial-recognition system 102, and speaker-recognition system 103, in well-known fashion.

Figure 3:
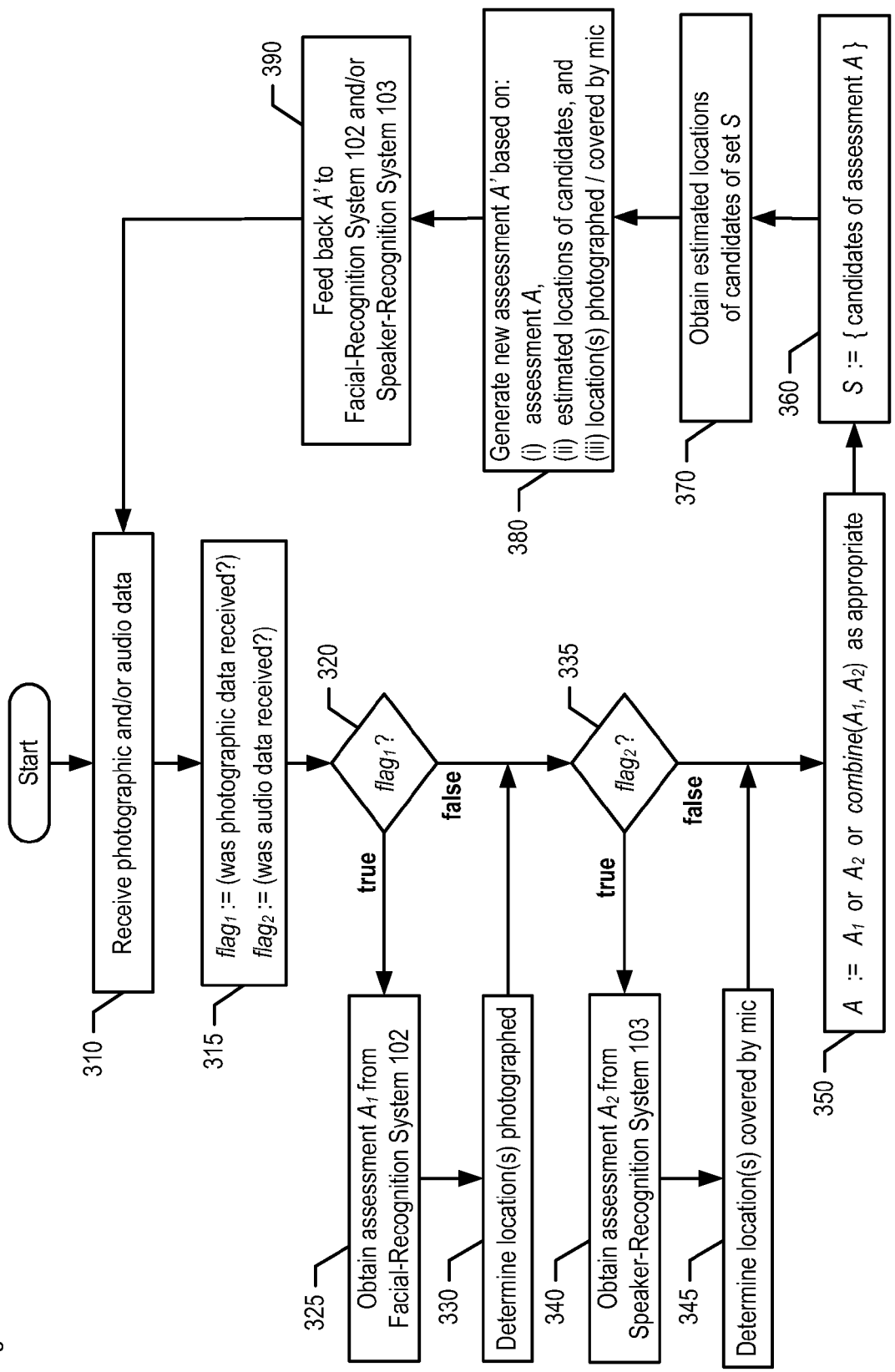
FIG. 3 depicts a flowchart of the salient tasks of master data-processing system 104, in accordance with the illustrative embodiment of the present invention.

FIG. 3 depicts a flowchart of the salient tasks of master data-processing system 104, in accordance with the illustrative embodiment of the present invention. It will be clear to those skilled in the art, after reading this disclosure, which tasks depicted in FIG. 3 can be performed simultaneously or in a different order than that depicted.

At task 310, photographic and/or audio data is received by master data-processing system 104. In accordance with the illustrative embodiment of the present invention, the photographic data comprises one or more photographs taken by a camera, as well as information about the camera (e.g., the location of the camera, the orientation of the camera, the field of view of the camera lens, etc.). As described in detail below and with respect to task 330, the information about the camera enables master data-processing system 104 to determine what location(s) are photographed. As will be appreciated by those skilled in the art, in some other embodiments of the present invention the photographic data might explicitly specify the photographed location(s), either instead of, or in addition to, the camera information.

The audio data comprises one or more audio samples captured by a microphone, as well as information about the microphone (e.g., the location of the microphone, the orientation of the microphone, the type of microphone, etc.). As described in detail below and with respect to task 345, the information about the microphone enables master data-processing system 104 to determine what location(s) are covered by the microphone. As will be appreciated by those skilled in the art, in some other embodiments of the present invention the audio data might explicitly specify these location(s), either instead of, or in addition to, the microphone information.

As will further be appreciated by those skilled in the art, in some embodiments of the present invention the photographic and/or audio data might be obtained from a remote data-processing system not depicted in the figures), while in some other embodiments of the present invention the camera/microphone apparatus might transmit these data directly to master data-processing system 104.

At task 315, Boolean variables flag1 and flag2 are set based on whether photographic data and audio data, respectively, were received at task 310.

At task 320, master data-processing system 104 tests variable $flag_1$: if true, execution proceeds to task 325, otherwise execution continues at task 335.

At task 325, master data-processing system 104 obtains an assessment $A_1$ of the photograph(s) received at task 310. Task 325 is described in detail below and with respect to FIG. 4.

At task 330, master data-processing system 104 determines what location(s) were photographed based on the camera information received at task 310, in well-known fashion. As will be appreciated by those skilled in the art, in some other embodiments of the present invention the photographed location(s) might be specified in the photographic data, in which case this determination merely involves extracting this information from the photographic data, rather than solving any requisite equations.

At task 335, master data-processing system 104 tests variable $flag_2$: if true, execution proceeds to task 340, otherwise execution continues at task 350.

At task 340, master data-processing system 104 obtains an assessment $A_2$ of the audio sample(s) received at task 310. Task 340 is described in detail below and with respect to FIG. 5.

At task 345, master data-processing system 104 determines what location(s) were covered by the microphone based on the microphone information received at task 310, in well-known fashion. As will be appreciated by those skilled in the art, in some other embodiments of the present invention the covered location(s) might be specified in the audio data, in which case this determination merely involves extracting this information from the audio data, rather than solving any requisite equations.

At task 350, master data-processing system 104 sets the value of variable A. If $flag_1$ is true and $flag_2$ is false, then assessment $A_1$ is copied to A; if $flag_1$ is false and $flag_2$ is true, then assessment $A_2$ is copied to A. If both $flag_1$ and $flag_2$ are true, then assessments $A_1$ and $A_2$ are combined in some fashion into a composite assessment A. As will be appreciated by those skilled in the art, there are a variety of ways in which assessments $A_1$ and $A_2$ might be combined (e.g., averaging two probabilities for a person and then re-normalizing across all candidates; using the maximum of two probabilities for a person and then re-normalizing across all candidates; using the minimum of two probabilities for a person and then re-normalizing across all candidates, etc.), and it will be clear to those skilled in the art, after reading this disclosure, how to make and use embodiments of master data-processing system 104 that perform task 350.

At task 360, variable S is initialized to the set of all candidates of assessment A, in well-known fashion.

At task 370, master data-processing system 104 obtains estimated locations of the candidates of set S. Task 370 is described in detail below and with respect to FIG. 6.

At task 380, master data-processing system 104 generates a new assessment A' based on:
 (i) assessment A,
 (ii) the estimated locations of candidates of set S, received at task 370, and
 (iii) the location(s) that were photographed and/or covered by the microphone.

As will be appreciated by those skilled in the art, the precise manner in which master data-processing system 104 generates a new assessment A' at task 380 can vary considerably among implementations. For example, in some embodiments of the present invention, assessment A' might be generated simply by removing any candidate from assessment A (i.e., "zeroing out" the candidate's probability and re-normalizing) whose estimated location is conclusively inconsistent with the location(s) that were photographed and/or covered by the microphone. Some other embodiments of the present invention, meanwhile, might employ a more sophisticated technique that is also capable of fine-tuning the probabilities of assessment A based on differences in location that are not as "flagrant."

At task 390, the assessment A' generated at tasks 380 is fed back to facial-recognition system 102 and/or speaker-recognition system 103. Task 390 is described in detail below and with respect to FIG. 7. After task 390, execution continues back at task 310.

Figure 4:
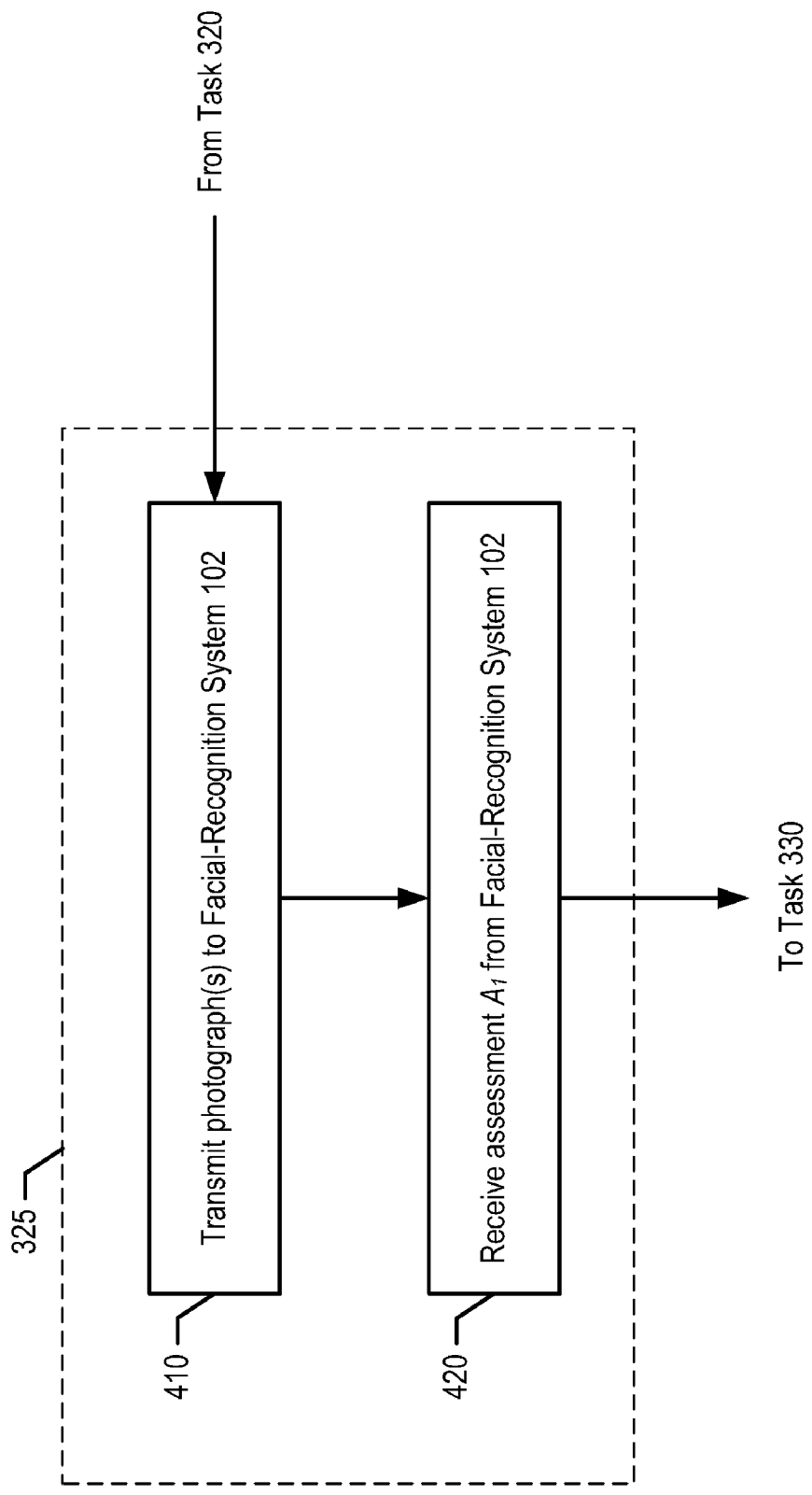
FIG. 4 depicts a detailed flowchart of task 325, as shown in FIG. 3, in accordance with the illustrative embodiment of the present invention.

FIG. 4 depicts a detailed flowchart of task 325, in accordance with the illustrative embodiment of the present invention.

At subtask 410, master data-processing system 104 transmits the photograph(s) received at task 310 to facial-recognition system 102, in well-known fashion.

At subtask 420, master data-processing system 104 receives an assessment $A_1$ from facial-recognition system 102, in well-known fashion. After subtask 420, execution continues at task 330 of FIG. 3.

Figure 5:
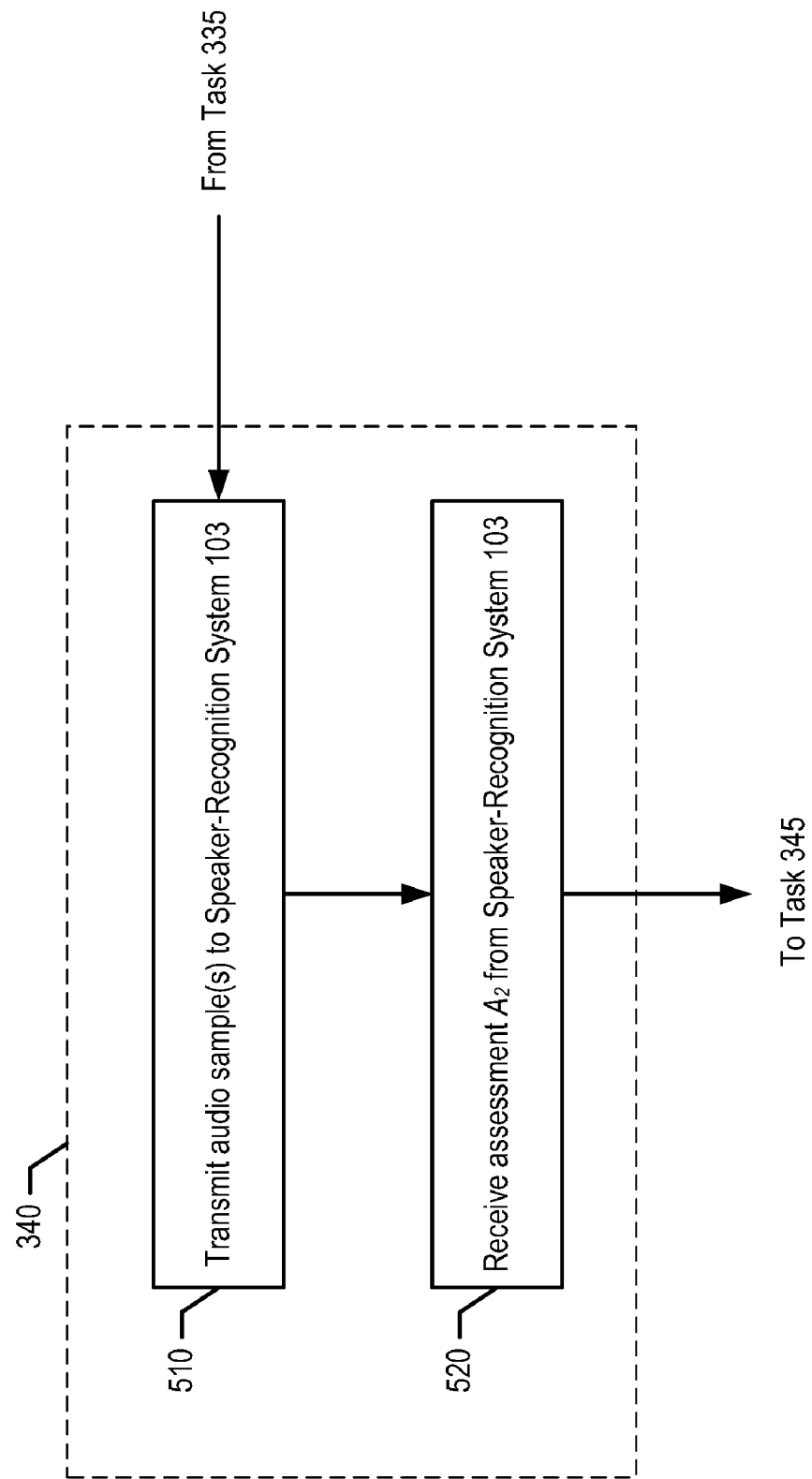
FIG. 5 depicts a detailed flowchart of task 340, as shown in FIG. 3, in accordance with the illustrative embodiment of the present invention.

FIG. 5 depicts a detailed flowchart of task 340, in accordance with the illustrative embodiment of the present invention.

At subtask 510, master data-processing system 104 transmits the audio sample(s) received at task 310 to speaker-recognition system 103, in well-known fashion.

At subtask 520, master data-processing system 104 receives an assessment $A_2$ from speaker-recognition system 103, in well-known fashion. After subtask 520, execution continues at task 345 of FIG. 3.

Figure 6:
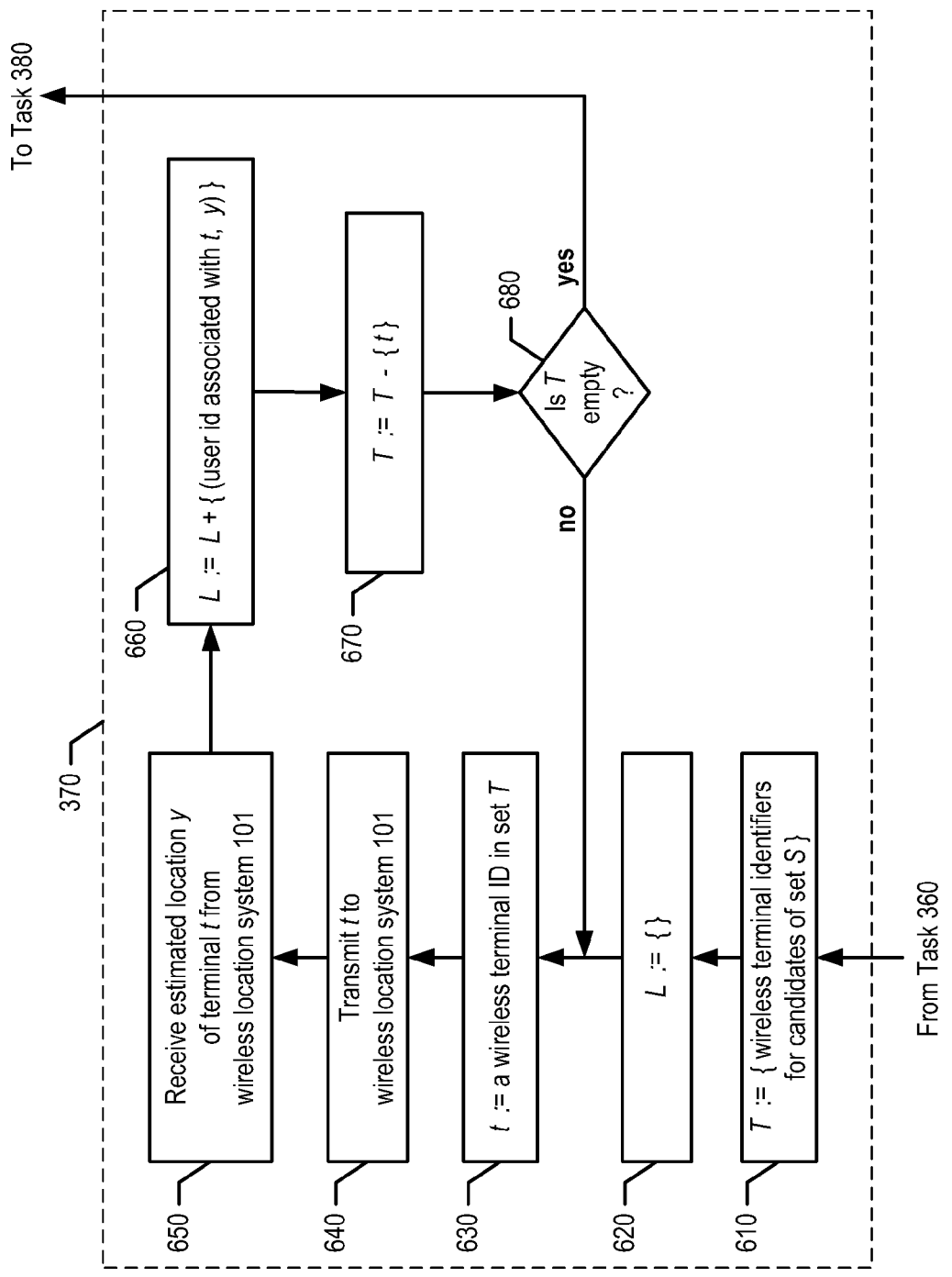
FIG. 6 depicts a detailed flowchart of task 370, as shown in FIG. 3, in accordance with the illustrative embodiment of the present invention.

FIG. 6 depicts a detailed flowchart of task 370, in accordance with the illustrative embodiment of the present invention. It will be clear to those skilled in the art, after reading this disclosure, which subtasks depicted in FIG. 6 can be performed simultaneously or in a different order than that depicted.

At subtask 610, variable T is initialized to the set of wireless terminal identifiers for the candidates of set S. In accordance with the illustrative embodiment, master data-processing system 104 maintains a hash table in memory 102 that associates candidate identifiers with wireless terminal identifiers. As will be appreciated by those skilled in the art, in some other embodiments the wireless terminal identifiers might be obtained in some other fashion (e.g., via queries to an external database, etc.), and it will be clear to those skilled in the art, after reading this disclosure, how to make and use such embodiments of the present invention.

At subtask 620, variable L is initialized to the empty set, in well-known fashion. At the conclusion of task 370, set L will contain the estimated locations of the candidates of set S.

At subtask 630, master data-processing system 104 selects a wireless terminal identifier from set T and copies the identifier into variable t, in well-known fashion.

At subtask 640, master data-processing system 104 transmits wireless terminal identifier t to wireless location system 101, in well-known fashion.

At subtask 650, master data-processing system 104 receives an estimated location y of wireless terminal identifier t from wireless location system 101, in well-known fashion.

At subtask 660, an ordered pair comprising:
(i) the candidate identifier associated with wireless terminal identifier t, and
(ii) estimated location y is added to set L, in well-known fashion.

At subtask 670, wireless terminal identifier t is removed from set T, in well-known fashion.

At subtask 680, master data-processing system 104 tests whether set T is empty; if so, execution continues at task 380 of FIG. 3, otherwise execution continues back at subtask 630.

Figure 7:
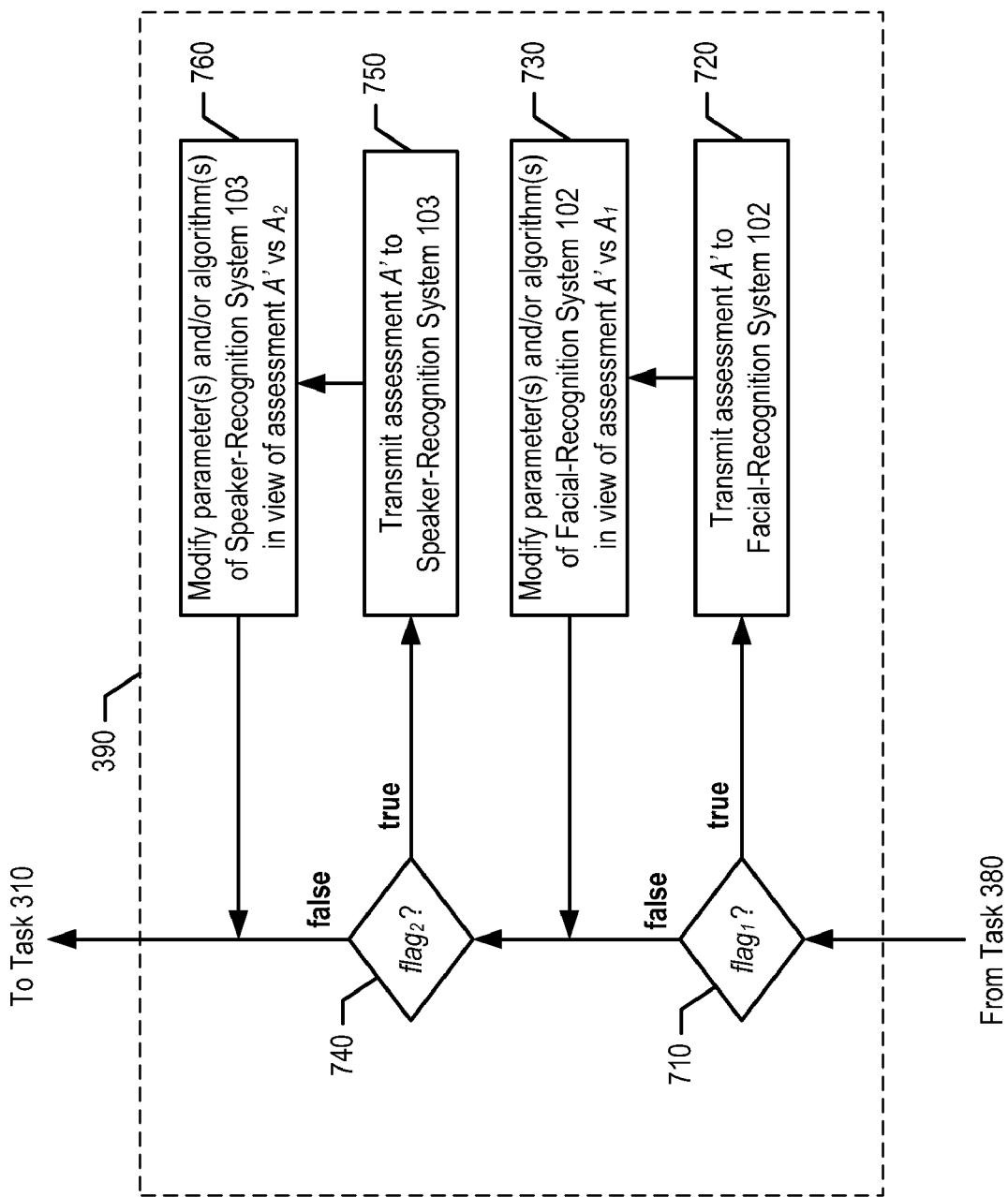
FIG. 7 depicts a detailed flowchart of task 390, as shown in FIG. 3, in accordance with the illustrative embodiment of the present invention.

FIG. 7 depicts a detailed flowchart of task 390, in accordance with the illustrative embodiment of the present invention. It will be clear to those skilled in the art, after reading this disclosure, which subtasks depicted in FIG. 7 can be performed simultaneously or in a different order than that depicted.

At subtask 710, master data-processing system 104 tests variable $flag_1$: if true, execution proceeds to subtask 720, otherwise execution continues at subtask 740.

At subtask 720, master data-processing system 104 transmits assessment A' to facial-recognition system 102, in well-known fashion.

At subtask 730, facial-recognition system 102 modifies one or more of its parameters and/or algorithms in view of new assessment A' versus original assessment $A_1$. In accordance with the illustrative embodiment, facial-recognition system 102 performs subtask 730 by re-training its pattern classifier based on the supplied photograph(s) and assessment A'. As will be appreciated by those skilled in the art, some other embodiments of the present invention might perform subtask 730 in some other fashion, while in still some other embodiments subtask 730 might not even be performed at all.

At subtask 710, master data-processing system 104 tests variable $flag_1$: if true, execution proceeds to subtask 720, otherwise execution continues at subtask 740.

At subtask 720, master data-processing system 104 transmits assessment A' to facial-recognition system 102, in well-known fashion.

At subtask 730, facial-recognition system 102 modifies one or more of its parameters and/or algorithms in view of new assessment A' versus original assessment $A_1$. In accordance with the illustrative embodiment, facial-recognition system 102 performs subtask 730 by re-training its pattern classifier based on the supplied photograph(s) and assessment A'. As will be appreciated by those skilled in the art, some other embodiments of the present invention might perform subtask 730 in some other fashion, while in still other embodiments subtask 730 might not even be performed at all.

At subtask 740, master data-processing system 104 tests variable $flag_2$: if true, execution proceeds to subtask 750, otherwise execution continues back at task 310 of FIG. 3.

At subtask 750, master data-processing system 104 transmits assessment A' to speaker-recognition system 103, in well-known fashion.

At subtask 760, speaker-recognition system 103 modifies one or more of its parameters and/or algorithms in view of new assessment A' versus original assessment $A_2$. In accordance with the illustrative embodiment, speaker-recognition system 103 performs subtask 730 by re-training its pattern classifier based on the supplied audio sample(s) and assessment A'. As will be appreciated by those skilled in the art, some other embodiments of the present invention might perform subtask 760 in some other fashion, while in still other embodiments subtask 760 might not even be performed at all.

After subtask 760 has been completed, execution continues back at task 310 of FIG. 3.

As will be appreciated by those skilled in the art, after reading this disclosure, there are a variety of additional capabilities and features that can be integrated into some embodiments of the present invention. For example, in some embodiments facial-recognition system 102 might be part of a general imaged-based "person-recognition system" that is capable of recognizing bodily characteristics such as the size of a person's body, the shape of a person's body, the relative sizes of two or more parts of a person's body, hair color, hairstyle, and so forth, as well as more temporally-sensitive characteristics such as the type and color of a person's clothing, the presence (or absence) and type of accessories (e.g., hats, purses, briefcases, backpacks, wireless handsets, etc.), and so forth. As will be appreciated by those skilled in the art, many of these bodily characteristics can be more easily recognized than facial features at wider zooms, further distances, lower camera resolutions, poorer look angles or lighting, and so forth.

As another example, in some embodiments of the present invention, one or more of facial-recognition system 102, speaker-recognition system 103, and the aforementioned person-recognition system might make use of a historical sequence of locations from wireless location system 101. For example, consider the case in which a particular person of interest (or "target") is captured by a plurality of cameras (e.g., for example, by a plurality of surveillance cameras, etc.), but cannot be reliably identified due to the presence of extraneous persons in the images. Over time, however, the system might be able to recognize (e.g., via pattern classification, etc.) that a single person persists within the various images in common and therefore must be the target. The analysis of a sequence of target locations associated with various camera images or audio samples, therefore, could provide such embodiments with improved recognition capabilities.

As another example, in some embodiments of the present invention, one or more of facial-recognition system 102, speaker-recognition system 103, and the aforementioned person-recognition system might be presented with a set of images or audio samples in which a target whose appearance or voice is unknown is believed to be present among a plurality of persons (e.g., photographs of meetings, audio feeds from meetings, photographs of public spaces, etc.). In such embodiments, facial-recognition system 102 (or speaker-recognition system 103 or the aforementioned person-recognition system) might be capable of inferring which person is most likely to be the target based on their repeated appearance in the training photographs or audio samples.

As yet another example, in some embodiments of the present invention, integrated wireless location and facial/speaker-recognition system 100 might also have the ability to identify a person of interest (or "target") in an image or audio sample that contains a plurality of persons. For example, if it is known that a target is present in a public square and a surveillance camera in the public square captures a photograph of a plurality of persons, such embodiments could ascertain which, if any, of the persons in the photograph is likely to be the target.

As still another example, in some embodiments of the present invention, wireless location system 101 might be capable of autonomously (i.e., without explicit queries from master data-processing system 104) tracking one or more persons of interest (or "targets") and of issuing alerts to master data-processing system 104 when a target enters or exits a particular geographical area. In such embodiments, these alerts might prompt master data-processing system 104 to accordingly initiate capture and processing of video and audio associated with the geographical area (e.g., video feeds from surveillance cameras in the geographical area, etc.)

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   receiving, by a data-processing system from a facial-recognition system, an assessment A of a photograph taken by a camera, wherein said assessment A comprises a non-empty set of candidate user identifiers, and wherein said photograph is of one or more locations;
   transmitting, by said data-processing system, one or more of said non-empty set of candidate user identifiers to a wireless location system;
   receiving, by said data-processing system from said wireless location system, a non-empty set of estimated locations, wherein each of said non-empty set of estimated locations is for a respective wireless terminal that is associated with a respective one of said non-empty set of candidate user identifiers; and
   generating, by said data-processing system, a new assessment A' that is based on:
   (i) said assessment A,
   (ii) said non-empty set of estimated locations, and
   (iii) said one or more locations photographed by said camera,
   wherein said assessment A' comprises a non-empty set of candidate user identifiers.

2. The method of claim 1 further comprising transmitting, by said data-processing system, said new assessment A' to said facial-recognition system.

3. The method of claim 2 further comprising:
   receiving, by said facial-recognition system, said new assessment A'; and
   in response to said new assessment A', modifying a parameter of an algorithm of said facial-recognition system.

4. The method of claim 1 further comprising:
   receiving, by said facial-recognition system, said new assessment A'; and
   in response to said new assessment A', modifying an algorithm of said facial-recognition system.

5. The method of claim 1 further comprising determining, by said data-processing system, said one or more locations photographed by said camera.

6. The method of claim 5 wherein the determining of said one or more locations photographed by said camera is based on the location of said camera.

7. The method of claim 6 further wherein the determining of said one or more locations photographed by said camera is also based on the orientation of said camera.

8. The method of claim 1 wherein said camera is a pan-zoom-tilt surveillance camera.

9. The method of claim 1 wherein said camera is fixed at a particular location.

10. The method of claim 1 wherein said camera is not fixed at a particular location.

11. A method comprising:
    receiving, by a data-processing system from a speaker-recognition system, an assessment A of an audio sample captured by a microphone, wherein said assessment A comprises a non-empty set of candidate user identifiers, and wherein said microphone has an area of coverage that comprises one or more locations;
    transmitting, by said data-processing system, one or more of said non-empty set of candidate user identifiers to a wireless location system;
    receiving, by said data-processing system from said wireless location system, a non-empty set of estimated locations, wherein each of said non-empty set of estimated locations is for a respective wireless terminal that is associated with a respective one of said non-empty set of candidate user identifiers; and
    generating, by said data-processing system, a new assessment A' that is based on:
    (i) said assessment A,
    (ii) said non-empty set of estimated locations, and
    (iii) said one or more locations of said area of coverage of said microphone,
    wherein said assessment A' comprises a non-empty set of candidate user identifiers.

12. The method of claim 1 further comprising transmitting, by said data-processing system, said new assessment A' to said speaker-recognition system.

13. The method of claim 12 further comprising:
    receiving, by said speaker-recognition system, said new assessment A'; and
    in response to said new assessment A', modifying a parameter of an algorithm of said speaker-recognition system.

14. The method of claim 1 further comprising:
    receiving, by said speaker-recognition system, said new assessment A'; and
    in response to said new assessment A', modifying an algorithm of said speaker-recognition system.

15. The method of claim 11 further comprising determining, by said data-processing system, said one or more locations of said area of coverage of said microphone.

16. The method of claim 15 wherein the determining of said one or more locations of said area of coverage of said microphone is based on the location of said microphone.

17. The method of claim 16 further wherein the determining of said one or more locations of said area of coverage of said microphone is also based on the orientation of said microphone.

18. The method of claim 1 wherein said microphone is a unidirectional microphone.

19. The method of claim 11 wherein said microphone is fixed at a particular location.

20. The method of claim 11 wherein said microphone is not fixed at a particular location.

* * * * *